United States Patent [19]

Gritter et al.

[11] Patent Number: 5,045,988

[45] Date of Patent: Sep. 3, 1991

[54] ISOLATED ADJUSTABLE FREQUENCY AC INVERTER CONTROL

[75] Inventors: David J. Gritter, Racine, Wis.; Michael A. Shanblatt; Elias G. Strangas, both of East Lansing, Mich.

[73] Assignee: Eaton Corporation, Cleveland, Ohio

[21] Appl. No.: 560,113

[22] Filed: Jul. 31, 1990

[51] Int. Cl.$^5$ .......................................... H02M 3/335
[52] U.S. Cl. ........................................ 363/35; 363/37; 363/98; 363/132; 307/74; 307/75; 318/803; 318/804; 318/805
[58] Field of Search ................. 363/35, 37, 98, 132; 318/803, 804, 805; 307/74, 75; 323/902

[56] References Cited

U.S. PATENT DOCUMENTS 4,871,743  1/1990  May et al. ............................ 363/87
4,933,825  7/1990  Allington et al. ..................... 363/16

Primary Examiner—Peter S. Wong
Assistant Examiner—Bruce Dunn
Attorney, Agent, or Firm—Krass & Young

[57] ABSTRACT

The control for an AC inverter includes a low voltage microcontroller referenced to ground potential and a waveform generator coupled to the microcontroller through a serial data link including optical isolation devices. The waveform generator floats at the negative bus potential of the DC source for the inverter. The waveform generator produces switching signals for the inverter under control of the microcomputer. The waveform generator, serial communications circuitry and other support circuits are all part of a single application specific integrated circuit.

7 Claims, 1 Drawing Sheet

ISOLATED ADJUSTABLE FREQUENCY AC INVERTER CONTROL

FIELD OF THE INVENTION

This invention relates to AC inverter controls and particularly to controls for digitally controlled transistor bridge inverters for speed control of three phase motors with isolation of high and low voltage portions of the control.

BACKGROUND OF THE INVENTION

An inverter is used to provide AC current for a motor from a source of DC voltage such as an AC line rectified to energize a pair of DC busses with a potential of several hundred volts. Transistor switches selectively couple each phase of the motor to the positive and negative DC voltage busses for short periods to properly energize each phase of the motor. Pulse width modulation (PWM) is generally used to control each of the switches. When properly controlled this allows the frequency and magnitude of stator voltage applied to an induction motor to be managed so as to maintain constant flux in the motor over a wide speed range and to substantially reduce harmonics in the current supplied to the motor.

It is known to control the inverter switching digitally using a waveform generator in combination with or as part of the code within a microcontroller programmed to control the waveform generator operation on the basis of desired motor operation and feedback information from the motor. The waveform generator then outputs inverter switching signals to energize the motor. The microcontroller affords an operator interface with the inverter. The high potential DC voltage source is usually isolated from the waveform generator by opto-isolators which transmit high frequency switching signals to the transistor switches. Feedback information may be returned to the controller through opto-isolators and linear isolation amplifiers or isolated transducers. Such an arrangement is costly since these components are expensive and many are required. It is proposed then to configure a control having a minimal content of opto-isolators. In particular, it is proposed to provide protection from high voltages by using a serial data link with a pair of opto-isolators to communicate data between the microcontroller and the waveform generator as well as to communicate the feedback signals to the controller. The waveform generator then floats at the high potential of a DC bus and the microcontroller is referenced to ground potential.

Further cost advantages can be had without compromising control efficiency and accuracy by utilizing application specific integrated circuits (ASIC) in conjunction with opto-isolators. The serial communication scheme requires memory capability at the high voltage side of the opto-isolators and this is accommodated in the ASIC along with other serial communication functions, the waveform generator, a utility block including a crystal oscillator and test circuitry, fault logic, a control block to handle other input and output signals, analog/digital conversion, and an output block for generating gating signals to control the transistor switches.

SUMMARY OF THE INVENTION

It is therefore an object of the invention to provide an improved inverter having a waveform generator directly connected to the inverter bridge at high potential and isolated from the logic circuit which referenced to ground potential.

It is a further object to provide serial communications between such logic circuit and waveform generator wherein the waveform generator and other high potential circuits are consolidated in an ASIC.

The invention is carried out by an induction motor control circuit comprising: a low voltage logic circuit including a digital controller for generating motor control commands; means for supplying low voltage control signals to the controller; a high voltage DC source; an inverter comprising a plurality of controlled switches for coupling the high voltage DC source to an induction motor; an inverter control circuit referenced to the high voltage DC source and responsive to the motor control commands for generating inverter switching signals to actuate the controlled switches; and isolation means coupled between the low voltage logic circuit and the inverter control circuit for transmitting the motor control commands from the logic circuit to the inverter control circuit while isolating the low voltage logic circuit from the source of high voltage.

BRIEF DESCRIPTION OF THE DRAWINGS

The above and other advantages of the invention will become more apparent from the following description taken in conjunction with the accompanying drawings wherein like references to like parts and wherein.

DESCRIPTION OF THE INVENTION

Figure 1:
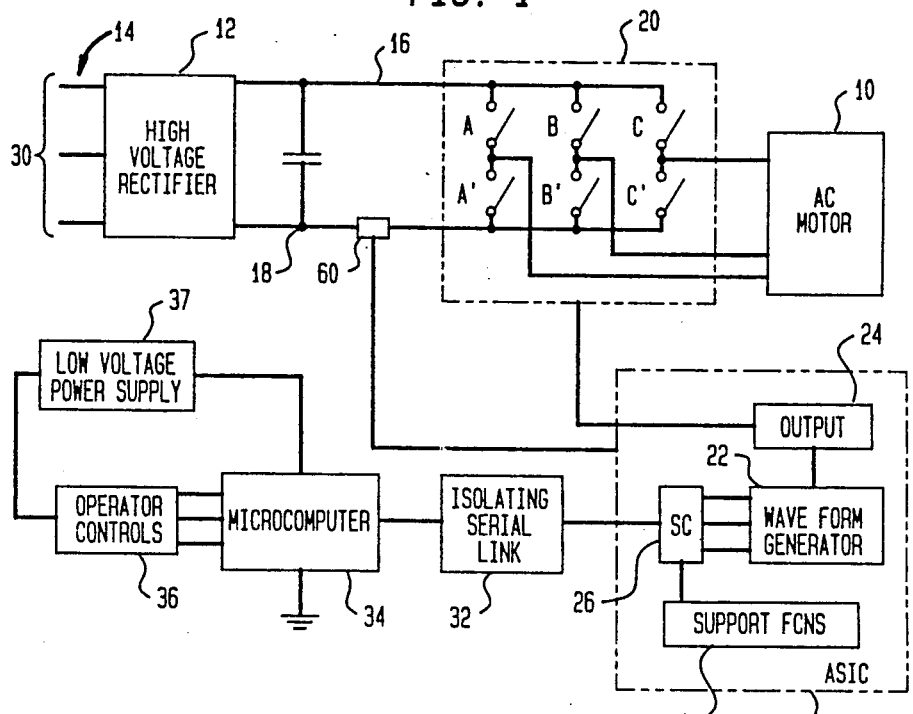
FIG. 1 is a block diagram of an inverter and control circuit according to the invention.

OVERALL SYSTEM: The diagram of FIG. 1 shows the overall system for controlling a three phase asynchronous (induction) AC motor 10. A DC power source here depicted as a rectifier 12 coupled to a three phase AC line 14 provides DC voltage on positive and negative DC busses 16 and 18. Of course single phase AC may be rectified as well. The voltage on the busses 16 and 18 is typically several hundred volts. The busses are not referenced to ground and thus float with respect to ground. Typically the negative bus is about 390 volts below ground. An inverter 20 of conventional structure comprises a plurality of transistor switches connected serially in pairs A—A', B—B' and C—C' across the positive and negative busses and each switch pair junction point is connected to an input of the motor 10 to energize a phase of the motor.

The switching convention used here is that if either switch of a pair is closed the other switch of the pair must be open; thus A' means A-not and always has the opposite state of A. An exception is imposed by an antioverlap function which may hold both switches open for an instant during a switching interval to insure that they are not both closed at any time. By selectively opening and closing the switches the three phases of the motor 10 are energized by many short pulses to create average current in each phase appropriate to the desired motor operation.

OPTICAL ISOLATION: The trigger pulses for operating the transistor switches of inverter 20 are produced by a waveform generator 22 and coupled to the inverter 20 via an output circuit 24. The waveform generator 22, the output circuit 24, a serial communication (SC) circuit 26 and other support functions 28 described below are all part of a single ASIC chip 30 which is referenced to the potential of the negative bus 18. An isolating serial link 32 including two opto isolators couples signals between the serial communication circuit 26 and microprocessor logic or microcontroller 34 which is referenced to ground potential and which generates signals to control the operation of the waveform generator 22. A conventional low voltage power supply 37 supports the microcontroller 34 and controls 36. Operator controls 36 provide inputs to the microcontroller 34. The grounded state of the logic allows control signals from external hardware such as switches, potentiometers, relays, programmable controllers, etc. to be directly connected to this portion of the circuitry without concern for operator or installer safety or the need for high voltage wiring. Thus the microcontroller 34 and the operator controls afford an interface between the operator and the waveform generator 22 through the isolating link which protects both the operator and the microcontroller from the high voltages of the DC bus 18. The placement of the ASIC 30 in the high voltage side allows the three negative power switching devices A', B' and C' to be directly driven (the positive switching devices being switched through simple level shifting circuitry), and allows high switching frequencies without the need for expensive opto-couplers or pulse transformers. At the same time, the optical isolation required for the serial link is neither difficult nor expensive, particularly when the ASIC provides the high side serial communication circuitry and low common mode dV/dt rates are observed. Bus current can be sensed by a simple shunt resistor and voltage by resistive dividers, not shown. Positive bus voltage and each phase voltage is thus monitored. Average values of these analog signals are converted to digital form and sent through the serial port for control and readout purposes.

The ASIC 30 generates other control signals in addition to the normal gating signals. It includes PWM signal generators to provide analog references, and also provides for an external analog to digital converter. It communicates with the microcontroller 34 through a serial port which can be optically coupled with low cost components. The ASIC is programmed by the microcontroller by means of several addressable eight bit registers. Status information from the ASIC may be read by the microcontroller in a similar manner.

Figure 2:
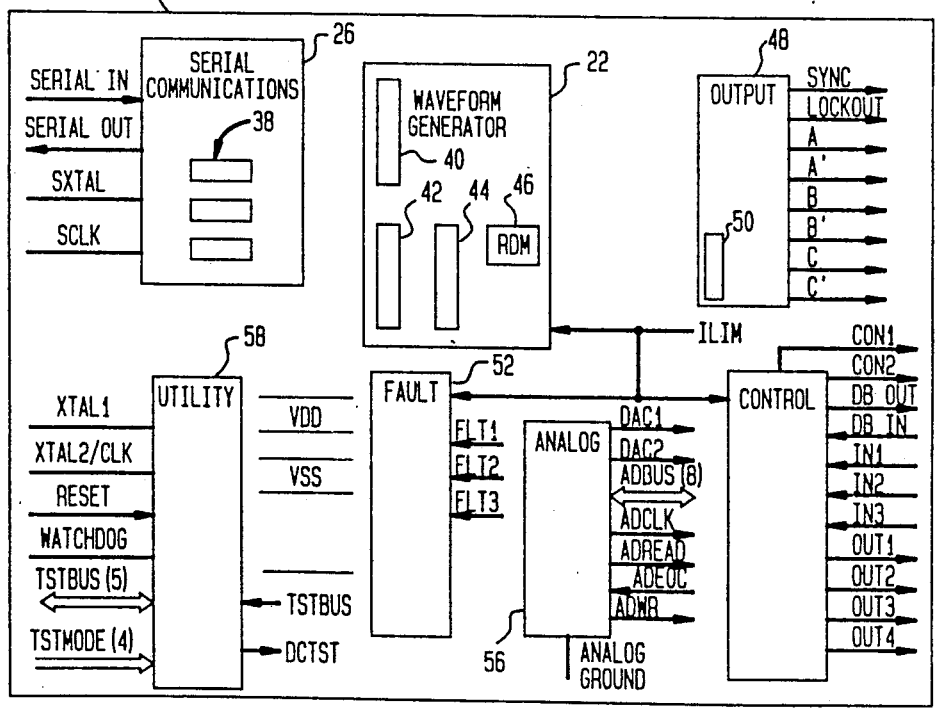
FIG. 2 is a diagram of an ASIC for waveform generation and inverter control at high voltage level according to the invention.

ASIC: While several technology choices are available, it is here preferred to use CMOS gate array technology to form the ASIC. The ASIC is shown in FIG. 2 and is divided into seven functional blocks. Each block has a set of registers associated with it by which the microcontroller establishes operating conditions or monitors the state of the ASIC or its inputs. For clarity, the signal busses interconnecting the blocks are not shown.

The serial communications block 26 is responsible for transferring data between the ASIC 30 and the microcontroller 34. It operates in an asynchronous mode, and provides error checking. Address registers 38 in this block point to the other registers in the chip.

The waveform generator 22 is the heart of the drive. It accepts 16 bit values in three registers 40, 42 and 44 for output frequency, carrier period, and duty cycle, respectively. It also includes a ROM 46 embodying lookup tables of reference voltage values and logic driven by the register contents for addressing the look up tables and for deriving pulse width modulated switching signals. The waveform generator produces three output phase signals based on a well defined algorithm which allows over-modulation, current limit, and both synchronous and asynchronous carrier types of operation. It calculates the period of the output frequency at sixty degree intervals.

An output block 48 generates six gating signals from the three phase signals produced by the waveform generator 22. Its register 50 allows anti-overlap time to be programmed. It responds to an external current limit signal and to register bits which enable the output and allow phase interchange for reversing the motor.

Three external fault signals and a current limit signal allow the fault block 52 to disable the drive and signal a fault to the microcontroller 34 through the serial port. A maximum current limit rate may be programmed. The fault block also monitors the gating signals and stores the number of the most recent gating signal to become active to allow diagnostic information to be displayed by the microcontroller.

A control block 54 provides additional external inputs and outputs. It also contains registers which allow the microcontroller to manipulate bit signals in other blocks.

Analog input and output is provided by two independent PWM signal generators and a parallel interface to an A/D converter in an analog block 56. This allows the microcontroller to monitor average bus current and to set current limit and dynamic braking references.

A utility block 58 provides a crystal oscillator, a watchdog timer, test circuitry, and a timing signal generator.

In operation of the ASIC chip, signals from the microcontroller are carried by the serial link 32 through an opto-isolator to the serial communications block which transfers the data to registers elsewhere on the chip according to addresses in the incoming signal. The data includes waveform information which is fed into the registers 40, 42 and 44 in the waveform generator 22. These registers are updated frequently by the microcontroller to continually control the waveform produced. The output of the waveform generator 22 is supplied to the output 48 which directly operates the negative inverter switches and operates the positive inverter switches through a simple level shifting circuit. An external current sensor 60 responsive to average bus current feeds a current signal to the analog circuit 56. Whenever the current exceeds a set limit, a limit signal is sent to the fault block 52, the control block 54 and the waveform generator. If this current limit occurs too often, the fault block issues a fault signal.

Three other external inputs to the fault block as well as a watch dog signal can trigger a fault signal. The effect of the fault signal is to shut down the output circuit 48 to terminate inverter operation, and to set a fault flag in a status register in the control block 54. For diagnostic purposes, the fault block also latches into a register a code representing the type of fault which occurred and the last switch signal issued. The microcontroller regularly queries the status register and if a fault is found it also queries the fault block register to determine the cause of the fault. A watch dog circuit in the utility block 58 is reset each time the microcontroller queries the status register. If the query fails to occur within a preset time period indicative of microcontroller or serial link failure, the watch dog circuit signals the fault block which issues a fault signal to turn off the inverter.

Thus the ASIC chip provides a self sufficient control circuit able to function at the voltage level of the inverter bus and requiring only control data from the microcontroller which can readily be supplied over the serial link which is serviced by a relatively inexpensive optical coupler.

The embodiments of the invention in which an exclusive property or privilege is claimed are defined as follows:

I claim:

1. An induction motor control circuit comprising:
    a low voltage logic circuit including a digital controller for generating motor control commands;
    means for supplying low voltage control signals to the controller;
    a high voltage DC source;
    an inverter comprising a plurality of controlled switches for coupling the high voltage DC source to an induction motor;
    an inverter control circuit referenced to the high voltage DC source and responsive to the motor control commands for generating inverter switching signals to actuate the controlled switches; and
    isolation means coupled between the low voltage logic circuit and the inverter control circuit for transmitting the motor control commands from the logic circuit to the inverter control circuit while isolating the low voltage logic circuit from the source of high voltage.

2. The invention as defined in claim 1 wherein the isolation means comprises a serial data link having optical isolating coupling means between the low voltage circuit and the high voltage control circuit.

3. The invention as defined in claim 1 wherein the inverter control circuit comprises means for storing the motor control commands, a waveform generator responsive to the waveform commands for determining switching commands, and an output circuit coupled to the waveform generator and responsive to the switching commands for outputting switching signals to actuate the controlled switches.

4. The invention as defined in claim 1 including means in circuit with the high voltage source for sensing a motor operation parameter, and
    means including the isolation means for transmitting the said parameter to the low voltage logic circuit.

5. The invention as defined in claim 2 wherein the inverter control circuit is embodied in an application specific integrated circuit and includes serial communications circuitry, registers for receiving from the serial communications circuit data representing the motor control commands, a waveform generator including the said registers for determining switching commands, and an output circuit responsive to the switching commands for outputting switching signals to actuate the inverter switches.

6. The invention as defined in claim 5 wherein the inverter control circuit which is embodied in the application specific integrated circuit further includes means for sensing faults in motor operation and in communication with the low voltage logic circuit and for terminating inverter operation when specified faults occur.

7. An induction motor control circuit comprising:
    a low voltage user interface circuit including a user input device for entering operator commands and a controller connected to said user input device for receiving said operator commands and generating corresponding motor control commands;
    a source of high voltage DC electricity;
    a plurality of semiconductor controlled switching devices connected to said source of high voltage DC electricity and the induction motor having selectable conducting and nonconducting states;
    a waveform generator directly connected to said plurality of semiconductor controlled switching devices for controlling said conducting and nonconducting states of said plurality of semiconductor switching devices in accordance with received motor commands for control of the motion of the induction motor, whereby the waveform generator is connected to the high voltage DC electricity; and
    an isolation device coupled to said user interface circuit and said waveform generator circuit for transmitting said motor commands from said user interface circuit to said waveform generator circuit while isolating said user interface circuit from said source of high voltage DC electricity.

* * * * *